July 13, 1926. 1,592,576

S. M. STONE

SPARE TIRE CARRIER FOR AUTOMOBILES

Filed July 12, 1923  2 Sheets-Sheet 1

July 13, 1926.
S. M. STONE
1,592,576
SPARE TIRE CARRIER FOR AUTOMOBILES
Filed July 12, 1923   2 Sheets-Sheet 2
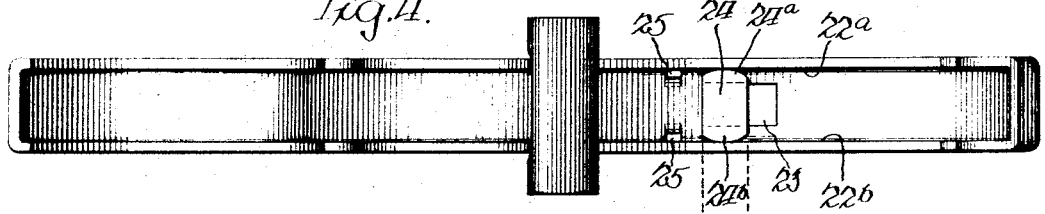
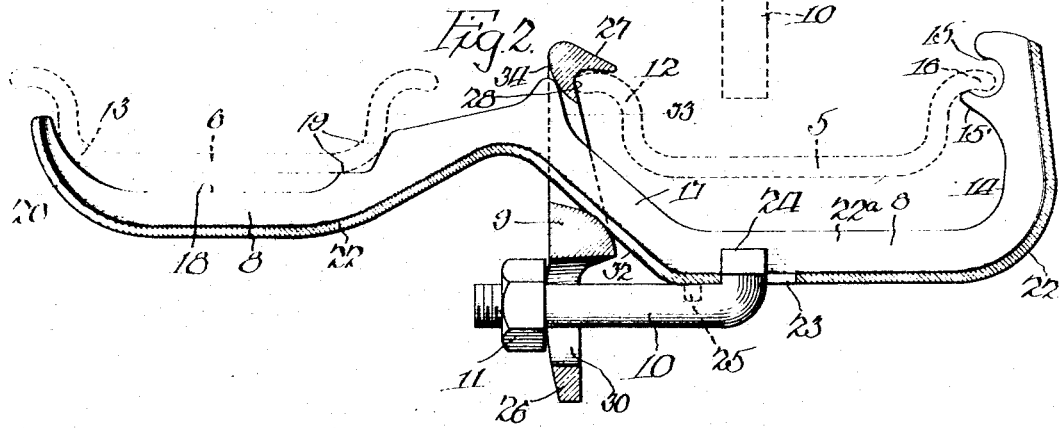
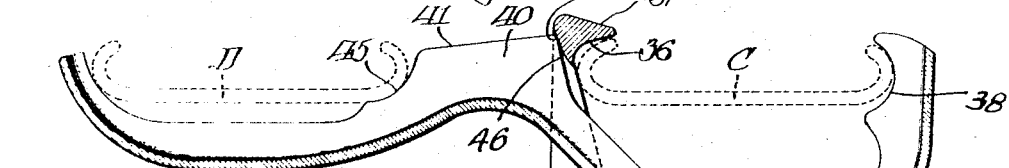
Inventor
Samuel M. Stone
by Arthur W. Wilson
Atty.

Patented July 13, 1926.

1,592,576

UNITED STATES PATENT OFFICE.

SAMUEL M. STONE, OF CHICAGO, ILLINOIS.

SPARE-TIRE CARRIER FOR AUTOMOBILES.

Application filed July 12, 1923. Serial No. 650,986.

The invention relates to means for carrying extra spare tires. It is common practice to provide automobiles with a tire carrier adapted to carry one spare. It is often desirable to be able to carry more than one spare tire especially when taking an extended trip.

It is an object of my invention to increase the capacity of any ordinary spare tire carrier by one or more tires by providing means that can be quickly and easily attached to the rim carried by the ordinary spare tire carrier.

It is also an object of my invention to provide a device adapted to receive additional demountable rim units and to hold them securely in place without the necessity of rope, straps or other devices that are unstable and which are likely to chafe or otherwise injure the tires.

Again I aim to provide a device which shall be cheap, light in weight, and yet durable and which can be produced rapidly in sufficiently accurate dimensions to make the interchange of the parts possible and to enable convenient and easy assembly and use.

I aim also to provide a device of the class described which shall be of such construction that it can be attached or detached by means of an ordinary wrench, pliers or the like.

The invention consists in a device of the form, construction, combination and arrangement of the parts whereby the above named objects, together with others that will appear hereinafter, are attainable; and my invention will be more readily understood by reference to the accompanying drawings which illustrate what I consider, at the present time, to be the preferred embodiment thereof.

In said drawings:

Fig. 2 is an assembly view of one of the three units as constructed for "straight side" rims, certain of the parts being shown in section better to disclose the construction and operation thereof.

Fig. 3 is a similar view of one unit as adapted for "clincher" rims.

Fig. 4 is a plan view projected from Fig. 2; and

Fig. 5 is a detail perspective view of the clamp or part 9.

Figure 1:
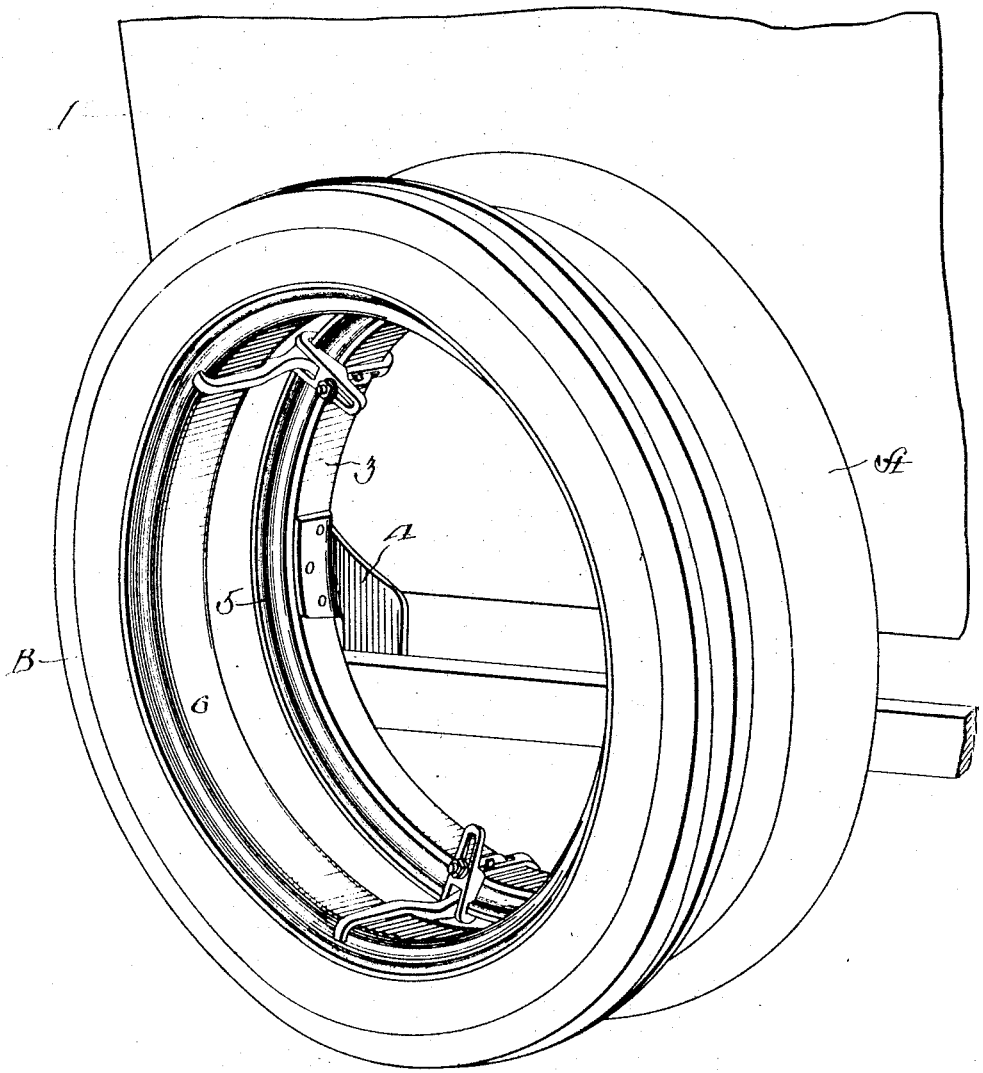
Fig. 1 is a perspective view of an ordinary spare tire equipment at the rear of a motor car, together with an extra spare tire carried by a set of devices embodying my invention.

Referring first to Fig. 1; numeral 1 denotes the rear end of an automobile body, equipped with a spare tire carrier, of known construction comprising an annular band 3 and supporting brackets as 4. The regular spare tire, marked A, is assumed to be fastened to carrier element 3 in any usual manner, (this detail not being relevant to the invention) by engagement with its rim 5. The extra spare tire, B, with its rim 6, is shown as supported in close proximity to spare tire A, by means to be described.

Referring next to Fig. 2 the dotted section 5 represents a radial section of the spare rim A shown in Fig. 1, and the dotted section 6, represents a radial section of the extra spare rim B shown in Fig. 1. These sections are for "straight side" tires, which are used upon all the larger sizes of automobiles.

The carrier unit consists of a tension arm 8—17, a clamp 9, and a bolt 10, 11. The tension arm comprises, at its extreme ends, means for engaging one flange 12 of spare rim A and means for engaging the outer base portion 13 of spare rim B. Specifically, the inner end of the arm 8 has an outwardly projected finger 14, in the end of which is an inwardly opening notch 15, which receives the rim flange 16. The intermediate portion 17 of said arm is bent obliquely outward. The outer half of the tension arm 8 has a concave rim-receiving face 18, a pair of shoulders 19, and an outwardly curved end 20, the word "outwardly" here meaning radially outward from the center of the rim B. The said shoulders 19 are so located as to form bearings for the inner shoulder 21 of rim B, as shown.

The tension arm, as here shown, is in the form of a stamping substantially U-shape in cross section and having a bottom portion 22 and the upstanding side portions 22ᵃ and 22ᵇ. It is in the upstanding side portions 22ᵃ and 22ᵇ that the peculiar shape obtains for the holding and clamping of the tire rims.

In the bottom of the tension arm there is provided a longitudinally disposed slot 23 which is rectangular in shape for the accommodation of the rectangularly shaped head 24 of the bolt 10. The bolt 10, it will be observed, is bent so that one portion is at substantially right angles to the other, the major portion extending in the same general direction as the tension arm. To insert the bolt 10 in the tension arm it is swung to the dotted line position shown in Fig. 4, which is at right angles to its normal or operative position, at which time the head 24 of the bolt is aligned with the slot 23 of the tension arm so that it can be passed therethrough. The bolt is then swung into line under the tension arm which disposes the head 24 transversely of the U-shaped tension arm, the end portions 24ᵃ and 24ᵇ of the head 24 being in substantial abutment with the side walls 22ᵃ and 22ᵇ of the tension arm so that sidewise motion is prevented. After the bolt 10 has thus been inserted and swung to its normal operative position it is preferably further secured against undesired movement as by punching downwardly tabs 25 which straddle the shank of the bolt 10. The bolt 10 carries a standard hexagon nut 11 which is preferably of the same size as that used in conjunction with the lugs and wedges of demountable rims so that the ordinary rim wrench may be used if desired.

The device is completed by a clamp member 9, which consists of a slotted body 29, a slotted tail 26, and a rim-hoof 27 formed on the end of said body opposite said tail. The rectangular slot 29 receives, loosely, the portion 17 of arm 8—8. The narrow slot 30 has a loose fit upon the bolt 10. The hook 27 is adapted to fit over the outer rim flange 12 as is best shown in Fig. 2.

The inner narrow wall 31 of the slot 29, presents an inclined convex surface to the contacting inclined face 32 of part 17. This face 32 is in fact a wedge face, and when the lugs 26 and 23 are drawn together by tightening the nut 11, this face rides outwardly upon the convex surface 31, thereby tilting the whole arm 8—8 radially outward; the point of lug 15' being the fulcrum of this movement.

To apply the carrier to the first spare rim: 1st—Engage each unit with said rim (5) in the manner shown in Fig. 2, leaving the nuts 11 far enough out on the bolts to permit the extra spare rim (6) to be passed over the three curved ends 20 of the tension arms. Place one unit at the bottom, as indicated on Fig. 1, and space the other two units equally. 2nd—Place the tire B, and its rim, 6, over the arms 8; the tire will now hang from the upper two arms. 3rd—With a rim wrench, run up each nut 11 until each of the arms bears with firm pressure upon the rim 6. Rim 6, with its tire, is now locked in position by the three outwardly curved ends 20, and as each arm 8 is tightly jammed against this extra rim, no rattling or other undesired movement can occur. The rims can, obviously, be quickly and easily demounted when necessary.

Referring to Fig. 3: C and D represent sections of clincher rims, the one at the right being supposedly the regular spare, and the one at the left being the extra spare rim. My carrier as adapted for rims of this sectional form embodies suitable variations from the construction disclosed in Fig. 2.

The concavity 36 of the hook 37 is more rounded. The radius of the curvature of the notch 38 is longer. Thus the clincher rim flanges 39 are properly engaged. The portion 40 of the tension arm is relatively deeper and its upper surface 41 less inclined from the horizontal. At one end of the portion 40 there is formed an abutment or corner 42. When the nut 43 is nearly off the bolt the clamp 37 could ride over the surface 41 and its upper end could lodge in the concave portion 45 were this movement not stopped by engagement of the edge 46 with the projecting corner 42. The mode of operation of this form of the device is the same as that described in connection with the straight side rim so that no further description is necessary.

Such modifications are contemplated as are within the scope of the appended claims.

I claim:

1. In combination, a tension arm, a clamp assembled in cross relation therewith, a bolt having a portion extending in the same general direction as the tension arm, and an angularly disposed portion entering the tension arm, said bolt serving to cause relative movement of the clamp and tension arm.

2. In combination, a tension arm, a clamp assembled in cross relation therewith, a bolt having a portion extending in the same general direction as the tension arm, an angularly disposed portion entering the tension arm, said bolt and tension arm being relatively formed to cause interlocking thereof, and said bolt serving to cause relative movement of the clamp and tension arm.

3. In combination, a tension arm, a clamp assembled in cross relation therewith, a bolt having a portion extending in the same general direction as the tension arm, and an angularly disposed portion entering the tension arm and the tension arm having pressed-down portions to engage the bolt, said bolt serving to cause relative movement of the clamp and tension arm.

4. In combination, a tension arm having a slot therein, a clamp assembled in cross relation with the tension arm, a bolt having a head entering the slot in the tension arm so as to be capable of a limited movement longitudinally thereof and loosely connecting the clamp and tension arm for the purpose specified.

5. In combination, a tension arm substantially U-shaped in cross section and having a slot therein, a clamp assembled in cross relation with the tension arm, a bolt having a T-head entering said slot and in operative position, being positioned at right angles to its inserted position, said bolt loosely connecting the clamp and tension arm for the purpose specified.

6. In combination, a tension arm substantially U-shaped in cross section and having a longitudinally disposed rectangular slot therein, a clamp assembled in cross relation with the tension arm, a bolt having a T-head entering said slot and being transversely positioned of the tension arm, said bolt loosely connecting the camp and tension arm for the purpose specified.

In testimony whereof, I have hereunto set my hand, this 6th day of July, A. D. 1923.

SAMUEL M. STONE.